United States Patent [19]

Willmann et al.

[11] 3,952,313
[45] Apr. 20, 1976

[54] TIME RECORDER
[75] Inventors: Erich Willmann, Zell (Neckar); Günther Trischler, Plochingen (Neckar), both of Germany
[73] Assignee: Simplex Time Recorder Co., Gardner, Mass.
[22] Filed: Sept. 9, 1974
[21] Appl. No.: 504,098

[30] Foreign Application Priority Data
Sept. 11, 1973 Germany............................ 2345728

[52] U.S. Cl. ................................................ 346/82
[51] Int. Cl.² ....................................... G01D 15/20
[58] Field of Search ................................ 346/82–86

[56] References Cited
UNITED STATES PATENTS
3,740,759   6/1973   McKeegan et al. ................ 346/82 X
3,805,026   4/1974   Anders ............................... 346/82 X FOREIGN PATENTS OR APPLICATIONS
2,156,852   5/1973   Germany

*Primary Examiner*—L. T. Hix
*Assistant Examiner*—Stanley J. Witkowski
*Attorney, Agent, or Firm*—Shenier & O'Connor

[57] ABSTRACT

A time recorder for recording time data in columns by means of a time controlled printing device on a data medium, the printing device and data medium being slidable relative to each other and every numerically recorded time datum having an identical feature, including a device having electrical circuit means with scanning means for the data medium to prevent overprinting on time data, the scanning means comprising an optical tracing device which is orientated to the position of the defined mark and responds to the presence of the said mark and drives a stop abutment.

8 Claims, 4 Drawing Figures

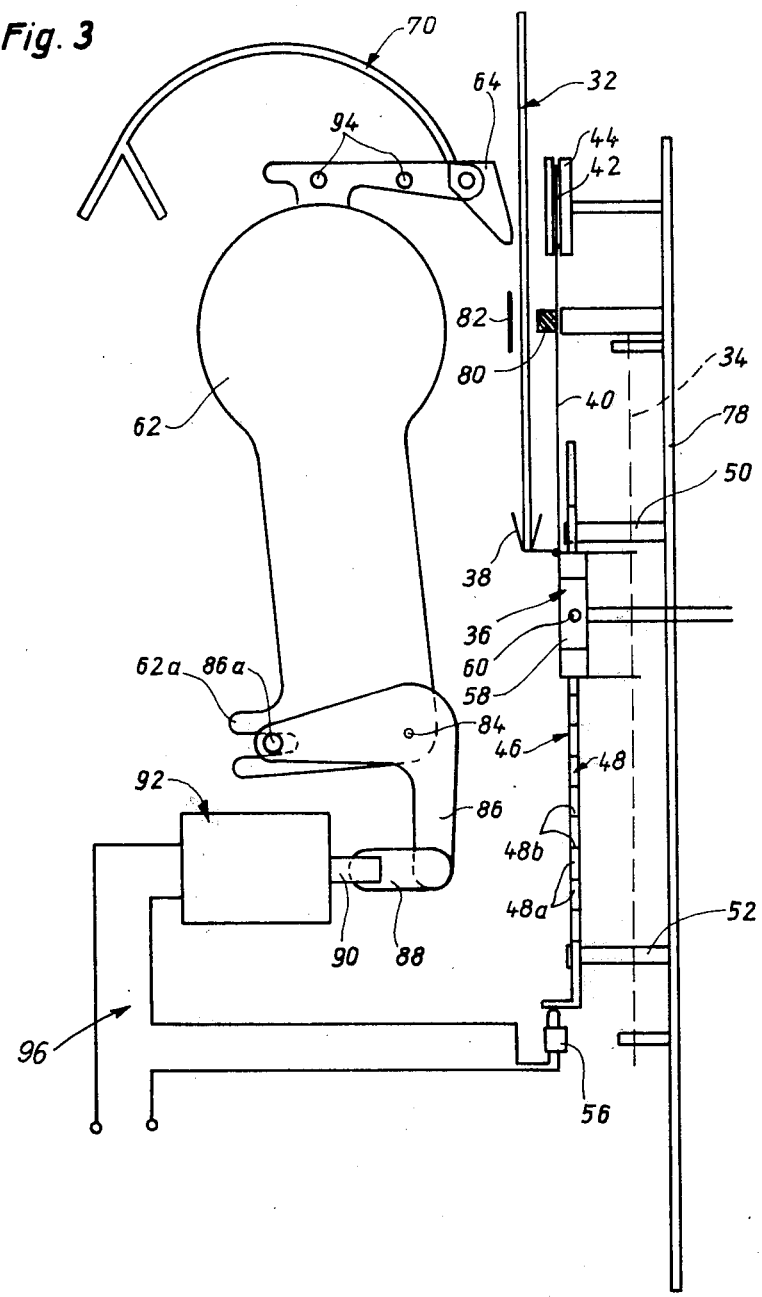

TIME RECORDER

This invention relates to a time recorder for recording time data in columns by means of a time-controlled printing device on a data medium, more particularly a stamping or recording card, the printing device and data medium being slidable relative to each other and every recorded time having a specific mark at a given position, with a device having scanning means for the data medium to prevent overprinting on time data.

Known time recorders, in the form of print-out clocks, have a slit into which a stamping card is inserted for the stamping operation and is removed therefrom after recording is completed. In this known kind of apparatus the leading edge of the stamping card, that is to say in use generally the bottom edge of the stamping card, will define the position of the first line into which a clock time and possibly other data will be printed. A deformation, for example a perforation, is produced in the card together with a first recording, the position of the deformation defining the position of the next line which is to be printed. A tracing device with a tracer pin cooperates with the deformations, the pin being spring-biased towards the stamping card and being adapted to trace the leading deformation in each case when the card is inserted into the slot of the apparatus thus locking the stamping card by means of a stop abutment in a position which is higher by one line spacing than in the preceding recording operation and at the same time triggering the printing device. In this way the stamp card is progressively printed from top to bottom line by line. In the known construction, utilizing deformations, errors accumulate owing to the manner in which the line spacing is defined solely by means of the tracer pin and the last deformation produced in each case in the stamp card; moreover, inaccuracies resulting from the edge of a perforation are included in the line definition, an effect which becomes particularly marked if a stamp card is forcibly pushed into the slot of a time recorder, an operation which necessarily causes the perforation edge of a conventional cardboard card to become deformed.

Stamping cards which are printed by time recorders of the kind described hereinbefore are being progressively evaluated by means of electronic data processing plants and are thus initially mechanically read. The maximum permissible positional tolerance of the characters which are to be read in the reading zone of conventional readers is only ± 1.2 mm. Conventional stamping cards contain 20 lines, one above the other, for recording time data so that the error in the line spacing must not exceed ± 0.06 mm assuming that a line position error becomes cumulative and if the the 20th line is still to be correctly positioned in the reading zone of the reader. It is obvious that this fact calls for exceptionally careful handling of the stamping cards and even then does not reliably exclude the possibility of deviating from the reading zone.

Furthermore, the known device for preventing overprinting of time data is of relatively complicated construction.

Finally, deformations and perforations in the stamped card cause difficulties when using known clear language readers.

Reference to the apparatus disclosed in the German Auslegeschrift No. 1,152,565 should be made as an example of known time recorders.

It is an object of the invention to simplify the means for preventing overprinting of time data in a time recorder of the kind described hereinbefore by contrast to known constructions. To this end the inventor proceeded from the mechanical solutions for a device adapted to prevent overprinting and utilised the fact that it is not difficult to arrange the recordings in such a way that each recorded time data has a specific mark at a predefined position. This specific mark may of course also be an additionally recorded character, for example an asterisk. According to the invention the tracing device, which is fixed relative to the printing device, is constructed as an optical tracing device which is orientated to the position of the specific mark and responds to the presence of the said mark. The mark contained in the recorded time data and being always constant provides conditions for the tracing operation which are always uniform as in known mechanical tracing devices so that the last printed line can be detected without error in the time recorder which is constructed in accordance with the invention. With the construction according to the invention it is also possible to define the zone of the data medium which is to be printed in future, for example by means of manually applied characters such as hyphens. The apparatus according to the invention is characterised not only by simple and operational reliable construction but also enables a higher information density to be obtained on the data medium because of the absence of deformations and peforations.

It is known to print time data in so-called OCR-A (Optical Character Recognition-Type A) characters. One preferred embodiment of the time recorder according to the invention dispenses with the printing of an additional character as a defining mark and makes use of the fact that time data usually contains the hour of the recorded clock time in the form 00 to 23 and the fact that the numerals 0, 1 and 2 which occur in the first digit of the time recording have a cross-bar at the bottom when using OCR-A characters; all numerals of the first digit of the hour recording therefore have the same specific mark in the form of this cross-bar. The basic idea of the invention can be embodied particularly simply if the tracing device is orientated to the first digit of the hour recording and is adapted to respond to the aforementioned cross-bar. The cross-bars which are traced in accordance with the invention occur with all numerals at the same position and are arranged so that they arrive first under the tracing device when the data medium is inserted into the apparatus.

In order to maintain the data medium during the recording operation in a specific position it is advisable to provide the means for preventing overprinting in known manner with a stop abutment which defines the recording position of the data medium relative to the printing position in the unprinted line adjacent to the preceding recording, the said stop abutment being controllable by the tracing device. A combination with a device constructed in this manner for preventing overprinting by means of an optical tracing device provides a time recorder by means of which time data can be recorded with a constant line spacing. To this end a preferred embodiment of the time recorder according to the operation is provided with a stop abutment which can be activated by a bolt which controls the tracing device, the said stop abutment being associated with a plurality of ratchets, the bar or the series of ratchets being slidable together with the data medium. The appropriate part could of course also be displaced together with the printing device but it is usual to prefer a fixed printing device and a moving data medium. Since the distance between ratchets can be exactly matched to the desired line spacing and since these ratchets alone define the recording position of the data medium - when the tracing device signals the presence of a free line - it is therefore possible to obtain precise line spacings without any cumulative errors.

It is appropriate to provide a rack with saw teeth to form the ratchet series so that it is not necessary for the bar to be released precisely at the time at which it is positioned opposite to a stop abutment formed by a ratchet; the sloping flanks of the saw teeth enable the bolt to be released before the recording position is reached.

To avoid the need for the tracing device to be positioned opposite to the specific trace signal of the preceding recording when the activated stop abutment and therefore the data medium have reached the recording position it is recommended for time recorders according to the invention into which stamping cards can be inserted and removed therefrom after recording to provide a self-holding circuit for the stop abutment which can be activated, the said self-holding circuit being closable by the tracing device and containing a switch which can be operated when a stamping card is inserted into the apparatus and opens the self-holding circuit when the stamping card is removed. Once the tracing device of such a construction has released the stop abutment it will remain in its operative state until the stamping card has once again been removed from the time recorder.

In view of the usually confined space conditions which prevail in time recorders it is advisable to provide the tracing device with glass fibre optics which are orientated to that position of the data medium which is to be traced. Particularly accurate tracing is obtained if the endface of the glass fibre optics nearest to the data medium have the same dimensions as the cross-bar which is associated with the numerals 0, 1 and 2 of the OCR-A characters and is to be traced.

The invention will now be described by way of example with reference to the accompanying drawings wherein:

FIG. 3 is a side view of the printing device of the time recorder and

Figure 1:
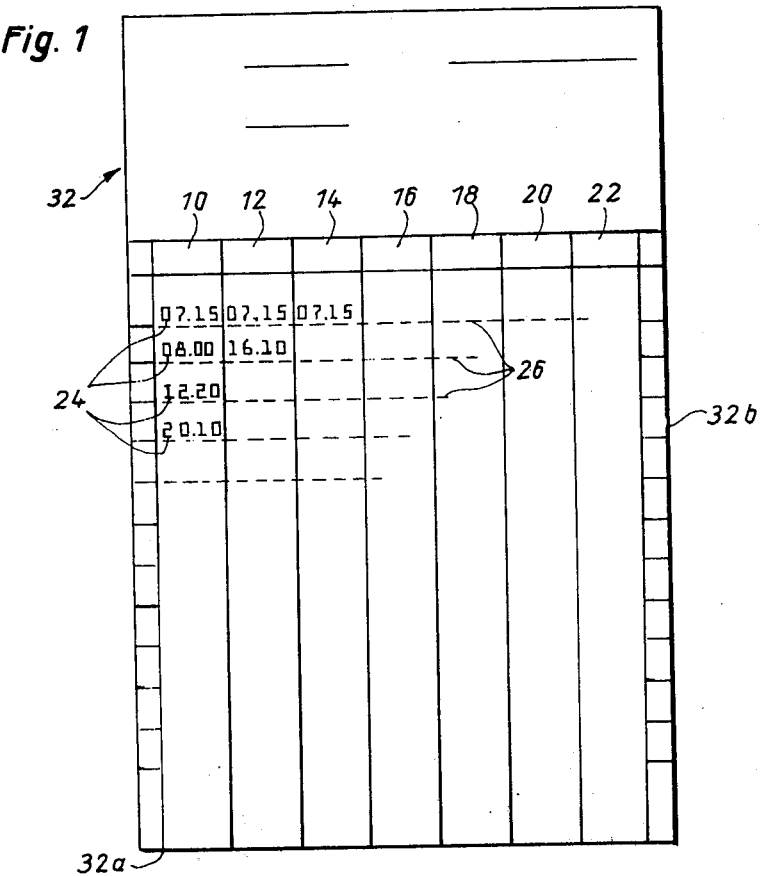
FIG. 1 is a partially printed stamped card of the kind which can be used for the time recorder illustrated in FIGS. 2 to 4.

The stamping card shown in FIG. 1 has 7 columns 10, 12, 14, 16, 18, 20 and 22 each of which is associated with one day of the week. The times of day on which the worker associated with this stamp card commences or terminates his work is to be recorded in the appropriate columns of each day. The time data contains the hour of the recorded clock time in the form 00 to 23 and after a dot contains minute data in the form 00 to 59. FIG. 1 shows that the time data is to be recorded in so-called OCR-A characters. In the type faces of this character the numerals of the first digit of the time data have a common, identical feature: since one of the numerals 0, 1 or 2 must always occur as the first digit of the imprinted time datum hour, the common identical feature comprises the cross-bar 24 appearing at the bottom of the numerals.

The lines are indicated as broken dashes at 26; however, they are not required for recording time data accurately in lines one below the other as will be explained in the description below. On the other hand, the lines can also be indicated or drawn in with dashes without interfering with the method of operation of the construction according to the invention by using reflecting inks or inks to which the optical tracing device does not respond for the lines 26 in the embodiment which will be described below.

Figure 2:
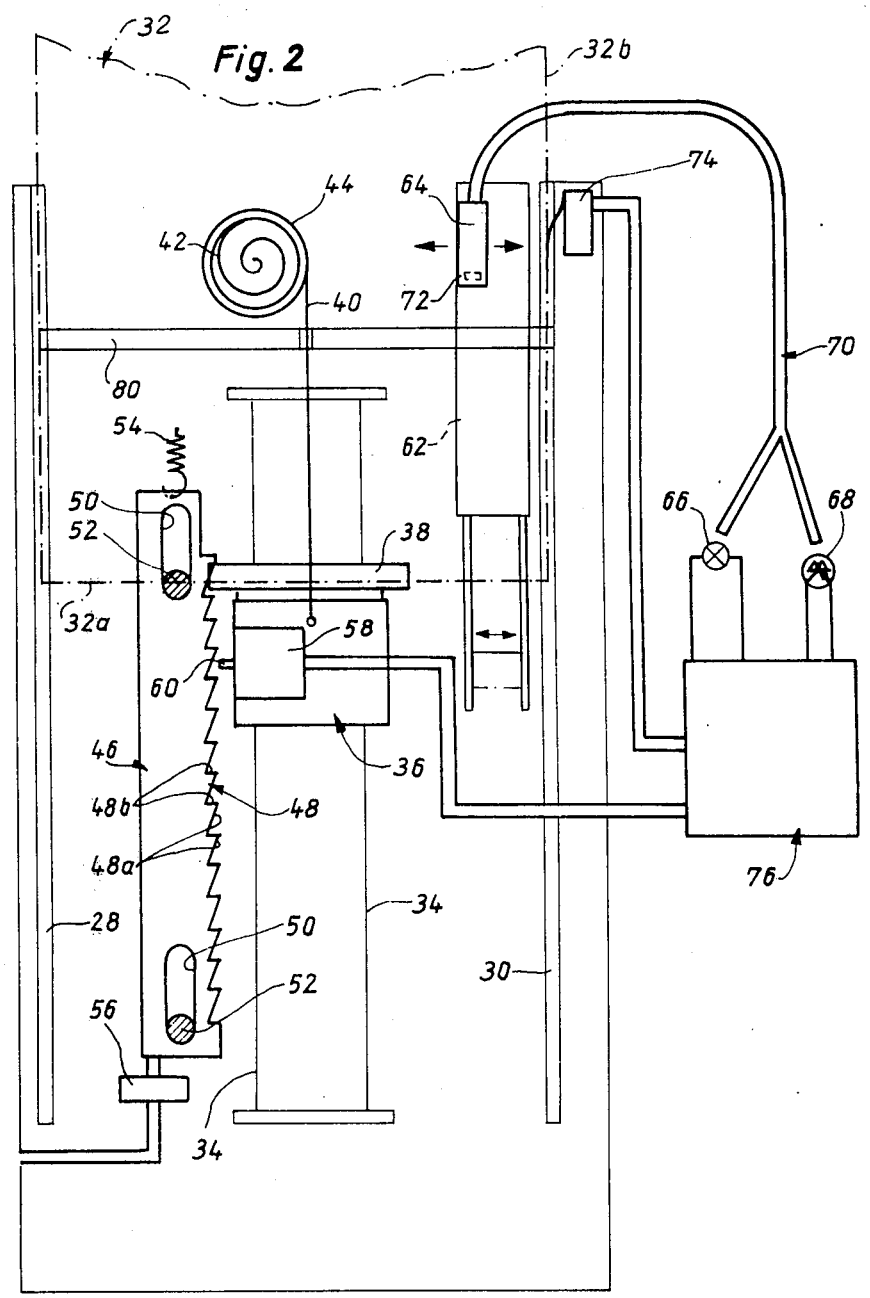
FIG. 2 is a diagrammatic view of the time recorder with the components which are essential to the invention.

FIG. 2 indicates two guide rails 28 and 30 between which a stamping card 32, indicated in dash dot lines, can be displaced in the vertical direction. It may be assumed that the top of the time recorder is provided with a slot, not shown, through which the stamping card 32 is inserted into the apparatus. A card slide, referenced in its entirety with the numeral 36, is slidably guided in the vertical direction on two guide bars 34 which are fixed with respect to the apparatus and are disposed outside the path of the stamping card 32. At the top the card slide is provided with a card support 38 against which the bottom edge 32a of a stamping card 32 inserted into the apparatus is placed. The card slide is suspended from a cord 40 which is coiled on to a spring barrel 44 which is biased by a coil spring 42 in such a way that the card slide is pulled upwardly. It is understood that the stamping card 32 must be sufficiently stiff to ensure that the pull of the cord 40 can be overcome if the stamping card is inserted into the apparatus and pushed downwardly.

According to the invention a rack 46 with a series of saw teeth 48 is situated according to the invention in front of or behind the path of the stamping card 32, the slope 48a of the said teeth being downwardly orientated according to the invention so that a horizontal flank 48b forms the top flank of each saw tooth. The rack is provided with two slots 50 into which engage pins 52 which are fixed with respect to the apparatus so that the rack is slidably guided in the vertical direction. The rack is under the action of a tension spring 54 which pulls the rack upwardly and the bottom end of the rack is able to actuate a microswitch 56 when the said rack is moved slightly downwardly from the position illustrated in FIG. 2.

The card slide 36 also supports an electromagnet 58 which is constructed as a lifting magnet and is provided with a core which functions as a bolt 60. The said bolt is pushed to the left towards the rack 46 when the circuit of the electromagnet 58 is closed and on the said circuit being interrupted a spring, not shown, retracts the bolt to the right according to FIG. 2 so that the saw teeth 48 of the rack are able to pass freely when the cars slide 36 is displaced.

Although not shown in detail in FIG. 2, a unit comprising a printing head 62 and a tracer head 64 is supported in the apparatus so as to slide transversely thereto. Reference to the patent application Ser. No. 504,097 filed Sept. 9, 1974, by Trischler et al. should be made regarding details of the printing head. The printing head may be of conventional construction and may comprise a plurality of number wheels for recording the time data on the stamping card 32. The tracer head 64 which is always orientated towards the first digit of the hour recording is always positioned in the same way as the printing head 62 in front of that column 10, 12, 14, 16, 18, 20 or 22 of the stamping card (see FIG. 1) into which the recording is to be made in accordance with the appropriate day of the week. Since the construction and control of the printing head - with the exception of the transverse slidability thereof - can be of a conventional kind it is not necessary to describe it in detail.

The tracing head 64 is part of an optical tracing device which also comprises a light source 66, a photo transistor 68 and an optical glass fibre system 70. The endface 72 of the strand representing the optical glass fibre system terminates in the tracing head 64 and has the dimensions of the cross-bars 24 which are to be traced (see FIG. 1) and is positioned opposite the vertical slip of the column 10 to 22 in which the first digit of the hour recording is situated. If the aforementioned endface is situated opposite to a cross-bar 24 with a colour which does not reflect the part of the spectrum of the light source 66 to which the photo transistor 68 responds, the tracing device according to the invention will indicate that it is positioned opposite to a printed line 26 (see FIG. 1). Certain other reflecting colours are not detected by the tracing device according to the invention so that divisions of the stamping card can be printed in such colours.

Finally, a limit switch 74 is provided to cooperate with the right hand edge 32b of the stamping card and which is closed when a stamping card is inserted into the apparatus according to the invention.

FIG. 2 finally shows in diagrammatic form a control circuit 76 to which the electromagnet 58, the light source 66, the photo transistors 68 and the limit switch 74 are connected. The method of operation will be explained subsequently.

FIG. 3 shows different parts which are also shown in FIG. 2; FIG. 3 also discloses the following:

One rear wall 78 of the apparatus supports a rubber strip 80, which is also indicated in FIG. 1 and against which the printing head 62 presses the stamping card 32 in the course of a recording operation. An inking ribbon 82 is also indicated between the printing head and the stamping card. FIG. 3 also shows that the printing head guides the tracing head 64.

The unit comprising the printing head and the tracing head is supported so as to be pivotable on a shaft 84, merely indicated, and so as to be slidable perpendicularly to the plane of the drawing of FIG. 3 (FIG. 3 shows a side view of certain parts of the FIG. 2 in accordance with a view of this illustration from the left). The shaft also supports a double-armed operating lever 86 which is also pivotable about the shaft and can be slidable along the said shaft. A pin 86a of the said lever engages with a fork 62a of the printed head 62 and is thus coupled thereto. At the end which is distal with respect to the printing head a link 88 acts on the lever and connects the said lever in jointed manner to the core 90 of a printing magnet 92 which is constructed as a lifting magnet. When the printing magnet is energised the printing head 62 strikes against the inking ribbon 82, the stamping card 32 and the rubber strip 80 and thus records the appropriate time data on the stamping card.

In this context it should be noted that the tracing head 64 is coupled to the printing head 62 only in the transverse direction (in accordance with FIG. 2), and is entrained by the printing head when this traverses transversely without of course co-executing the actual stamping motion. For this reason the tracing head 64 is supported so as to be transversely slidable on its own two guide bars 94.

As may also be seen by reference to FIG. 3 the microswitch 56 closes the circuit 96 of the printing magnet on being actuated by the rack 46.

Figure 4:
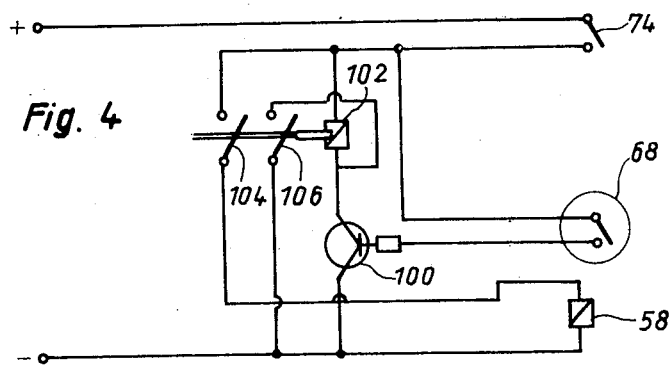
FIG. 4 is a circuit diagram of part of the tracing device.

In FIG. 4 the photo transistor 68 is shown as the switch. If the position of the stamping card 32 which is positioned opposite to the endface 72 of the optical glass fibre 70 reflects the light of the light source 66 the photo transistor 68 will represent an open switch; however, if the light of the light source 66 is at least partially absorbed, more particularly by a cross-bar 24 (see FIG. 1) the photo transistor will represent a closed switch so that a transistor 100 becomes conductive, and, limit switch 74 having initially been closed, energizes a relay 102 and closes two contacts 104 and 106. The circuit of the electromagnet 58 is closed through the contact 104 while the contact 106 provides self-holding for the relay 102 if the photo transistor 68 ceases to conduct so that self-holding continues until the limit switch 74 is opened when the stamping card is removed from the apparatus according to the invention.

The method of operation of the time recorder according to the invention is therefore as follows:

When a stamping card 32 is inserted into the apparatus according to the invention the said card first closes the limit switch 74. Since the stamping card is inserted into the apparatus with its bottom edge 32a leading it follows that the tracing head 64 triggers the electromagnet 58 as soon as the said tracing head detects a cross-bar 24 in the bottom line of the already printed lines 26. It is assumed that the tracing head 64 and the printing head 62 is positioned opposite the columns 10 to 22 in which printing is to be performed in accordance with the appropriate day of the week. This is achieved by conventional means which will therefore not be explained in this context.

It is an important feature of the invention that the position of the tracing head 64 relative to the printing head 62 is such that the printing head 62 is able to print in the adjacent, still free line 26 when the endface 72 of the optical glass fibre 70 has traced the cross-bar 24 in the line 26 which was printed last. The distance between the endface 72 of the optical glass fibre 70 and the effective zone of the printing head 62 will appropriately be made slightly smaller so that the bolt 60 of the electromagnet 58 is pushed forward prior to reaching the horizontal flank 48b of the particular saw tooth 48 which corresponds to the line which is to be newly printed. In order not to have to reduce the reaction time of the tracing device excessively it is even advisable to trigger the stop abutment which can be activated and takes the form of the bolt 60 as soon as it has passed the preceding ratchet in the form of the preceding horizontal flank 48b.

The distance between horizontal flanks 48b of the rack 46 is therefore equal to the line spacing in the stamping card.

If the stamping card has reached a position in which its topmost line 26 which has not yet been printed is positioned opposite to the operative zone of the printing head 62 the rack 46 will therefore be entrained due to the advanced bolt 60 in the course of a further downward motion of the stamping card 32. Further displacement of the stamping card in the downward direction is however limited by the microswitch 56 and where appropriate by a stop abutment, not shown, for the rack 46. The microswitch 56 will however be operated to trigger the printing operation.

Devices which insure that the printing head pivots back into the starting position shown in FIG. 3 after the printing operation and to prevent the printing device being once again operated before the stamping card has been completely removed from the apparatus are already known so that it is not necessary to describe them in this context.

When the stamping card 32 is withdrawn from the apparatus according to the invention the card slide 36 initially remains in the recording position which it has last assumed until the limit switch 74 interrupts the self-holding circuit for the electromagnet 58; this is of course conditional upon the force by which the bolt 60 is pushed to the left by the electromagnet 58 in accordance with FIG. 2 together with the action of the slopes 48a prevent the spring barrel 48 pulling the card slide 36 in the upward direction. After removing the stamping card and removing the limit switch 74 the card slide 36 will return into its top starting position.

A cross-bar which is detected by the tracing head 64 but is not shown in FIG. 1 can be provided so that the first topmost line 26 of the columns 10 to 22 is printed in the correct position.

What we claim is:

1. A time recording device for use with a record medium on which time data are to be imprinted on respective lines of a column with each datum including as a first digit one of the group of digits 0 and 1 and 2 and each of which digits has the common feature of an optically detectable cross-bar at its base, including in combination,
   a. printing mechanism including a printing head for printing data, each of which includes a first digit having an optically detectable cross-bar at its base,
   b. positioning means for receiving a record medium inserted in said device,
   c. optical sensing means for detecting the presence of one of said cross-bars,
   d. means mounting said sensing means in a fixed position with respect to said printing mechanism at a location at which it can register with the cross-bar of the first digit of a printed datum, and
   e. means responsive to said sensing means for actuating said printing means.

2. A device as in claim 1 in which said positioning means comprises actuatable stop means controlled by said sensing means for limiting the movement of said record medium into said device so as to position said medium with the line of said column next to printed adjacent to said printing head.

3. A device as in claim 2 in which said actuatable stop means comprises a member formed with a plurality of notches, a second member having a bolt, and means mounting said bolt for movement between a position in one of said notches and a position clear of said notches, such movement being controlled by said sensing means, said first and second members being movable relative to each other and at least one of said members being movable relative to said printing means, such movement being in response to the insertion of a record medium into said device.

4. A device as in claim 3 in which said member is a rack formed with saw teeth.

5. A device as in claim 2 including means responsive to said sensing means providing a holding circuit for said actuatable stop means, said holding circuit comprising a normally open switch which closes in response to the presence of a record medium in said device.

6. A device as in claim 3, including means comprising a normally open switch for actuating said printing means, and means for closing said switch in response to concomitant movement of said first and second members, said movement being effected by insertion of a record medium into said device and when said bolt is in one of said notches.

7. A device as in claim 1 in which said sensing means comprises a fiber optics system having a glass fiber bundle provided with an end face having substantially the dimensions of one of said cross-bars.

8. A device as in claim 1 in which, with reference to the direction of movement of a record medium into said device said sensing means leads said printing head and is spaced therefrom by a distance such that the printing head is positioned opposite the line next to be printed when the scanning means is located opposite the cross-bar of the first digit of the last printed datum.

* * * * *